(No Model.)  J. E. BERING.  2 Sheets—Sheet 1.
POTATO PLANTER.

No. 582,166.  Patented May 11, 1897.

Attest,
Nora Graham.
Ina Graham.

Inventor
James Edward Bering,
by L. P. Graham
his attorney (No Model.) 2 Sheets—Sheet 2.

J. E. BERING.
POTATO PLANTER.

No. 582,166. Patented May 11, 1897.

Attest,
Nora Graham
Ina Graham

Inventor
James Edward Bering
by L. P. Graham
his attorney

UNITED STATES PATENT OFFICE.

JAMES EDW. BERING, OF DECATUR, ILLINOIS.

POTATO-PLANTER.

SPECIFICATION forming part of Letters Patent No. 582,166, dated May 11, 1897.

Application filed January 25, 1897. Serial No. 620,546. (No model.)

*To all whom it may concern:*

Be it known that I, JAMES EDWARD BERING, of Decatur, in the county of Macon and State of Illinois, have invented certain new and useful Improvements in Potato-Planters, of which the following is a specification.

This invention relates to planters in which the potatoes are automatically cut in the act of planting. It is exemplified in the structure hereinafter described, and it is defined in the appended claims.

Figure 1:
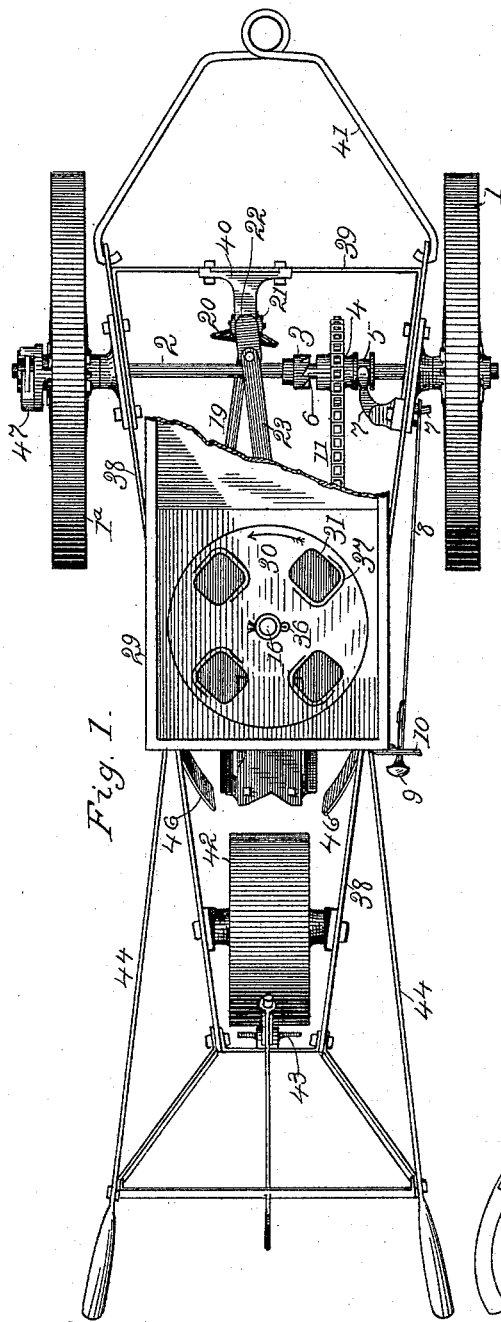
Figure 2:
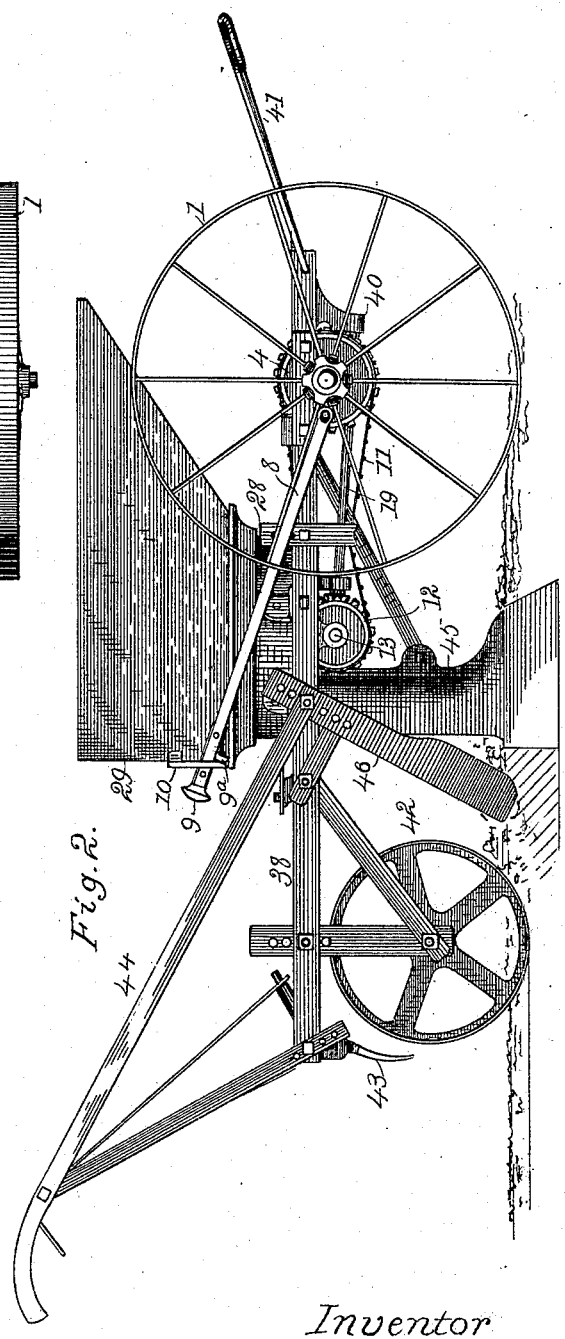
Figure 3:
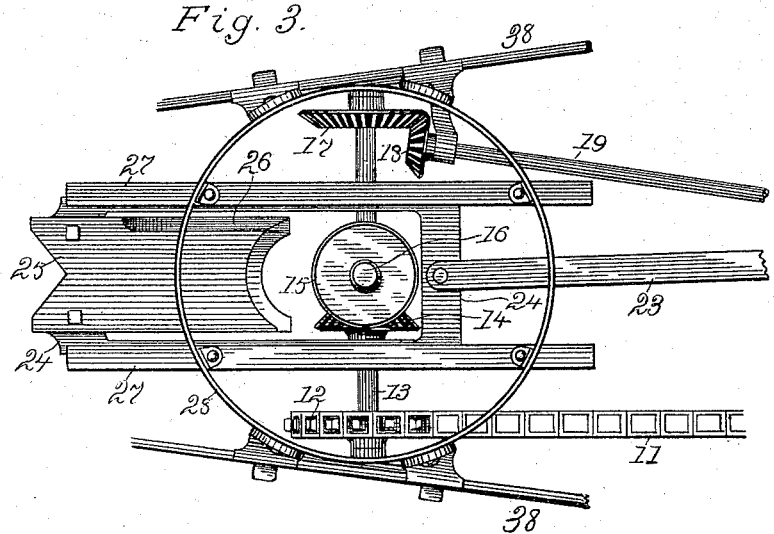
Figure 5:
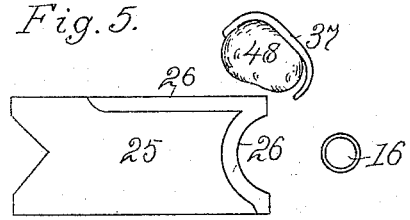
Figure 6:
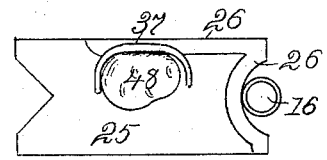
Figure 4:
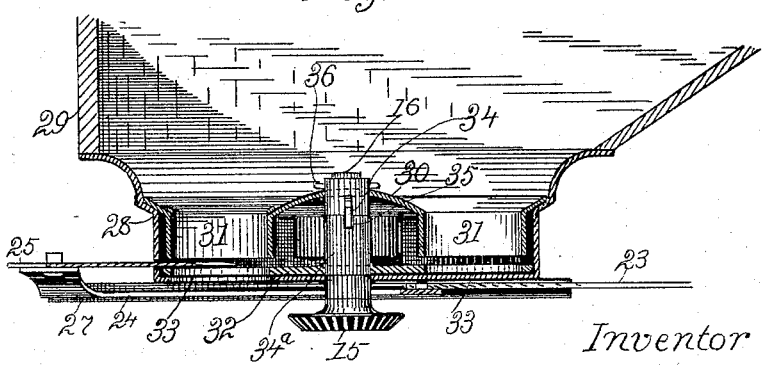

In the drawings forming part of this specification, Figure 1 is a plan of a planter constructed in accordance with my invention, a portion of the hopper being broken away to expose working parts. Fig. 2 is a side elevation of the planter. Fig. 3 is a plan showing the cutting device and the gearing under the hopper, the bottom of the hopper being omitted for that purpose. Fig. 4 is a central vertical section through the lower portion of the hopper, showing details of the cutting and dropping mechanism. Figs. 5 and 6 are details in plan, illustrating the operation of the cutting device.

The drawings illustrate a structure in which my invention is embodied, and I shall first describe the embodiment and then by means of the claims distinguish between the essentials and the non-essentials, between the old and the new, and between the features that are attributable to the inventive act and those that result from mechanical skill.

A pair of wheels 1 and 1ª are mounted on a shaft 2, each being preferably connected therewith by means of a pawl and ratchet, as indicated at 47, that permits the wheel to turn backward, but not forward, independent of the shaft. This provision enables one wheel to travel faster than the other in turning the planter around. A carrying-frame is constructed largely of bars 38, which are fastened to brackets mounted loosely on shaft 2, and such frame supports the hopper 29 and the planting mechanism connected therewith. A covering-wheel 42 is journaled in standards that extend downward from the rear end of the carrying-frame. A scraper 43 is provided for the covering-wheel. Handle-bars 44 extend obliquely upward and backward and provide means for guiding the machine, and the bail 41 provides a hitch for a draft-animal. A shank 45 is fastened to the bottom of the hopper. It has a furrow-opener on its lower end, and it acts as a chute to convey the potatoes to the bottom of the furrow. A pair of blades 46 may be used to aid in covering the furrow and pulverizing the soil.

The force that actuates the planting and cutting mechanism is derived from the wheels. The wheels turn the axle when the planter is drawn forward, and the motion of the axle is imparted to the cutting and planting mechanism by a train of gearing having peculiarities as follows:

A clutch member 3 is fixed on the shaft. A sprocket-wheel 4 is mounted loosely on the shaft adjacent to the clutch member. It has a clutch-face adapted to engage the clutch member 3, and it has a hub 5, which is grooved annularly. A lever 7 is pivoted to a bracket that is fastened to a bar 38. One of its ends is shaped to engage the annular groove of the hub of the sprocket-wheel and the other of its ends is diminished and rounded to fit into a hole in an end of bar 8. The other end of bar 8 has a head 9 and a tooth 9ª, and it extends through a slot in a bracket 10, which is fastened to the hopper 29. When the tooth 9ª of the bar 8 is in front of the lower wall of the slot of the bracket, as shown in Fig. 2, the sprocket-wheel is held in engagement with the clutch member of the shaft, and when the tooth is on the opposite side of the wall of the slot of the bracket the sprocket-wheel will be disengaged from the clutch member.

A chain 11 runs from sprocket-wheel 4 to sprocket-wheel 12, which is fixed on a shaft 13, that is journaled in the frame directly under the hopper. A gear-wheel 14 is fixed on shaft 13, and it meshes with a wheel 15, which is fixed on the lower end of a short vertical shaft 16. The shaft 16 is journaled in a boss formed in the center of the bottom of the hopper, and it extends above the bottom of the hopper some little distance, as shown in Fig. 4. A dropper-plate 32 is provided with a central hub 34ª, that is bored to slip over shaft 16, that is recessed in its upper surface at 35, and that has a set of openings or cells 33, which are in this instance four in number. Another dropper-plate 30 has a central hub that is bored to receive shaft 16, and it also has a set of cells that coincide with and conform to the cells 33 in plate 32. The hub of plate 30 has a rib 34, that fits in the recess 35 in hub 34ª, and the combined extent of the upper projection of hub 34ª and the downward projection of the hub of plate 30 is sufficient to hold the plate 30 raised out of contact with plate 32, as shown in Fig. 4. The lower plate is set loosely onto the shaft 16, the upper plate is set onto the shaft with the ribs of its hub engaging the recesses of the hub of the lower plate, and both plates are secured against turning on the shaft by means of a pin 36, which is set through the upper end of the upper hub and through the upper end of the shaft. The bottom of the hopper has a discharge-opening conforming to the cells of the dropper-plates, more or less accurately, and coinciding with the opening through the shank 45.

A gear-wheel 17 is fixed on shaft 13, and it meshes with wheel 18, which is fastened on shaft 19. The shaft 19 is journaled at its rear end in a bracket fastened to a bar 38 and at its front end in bracket 40, which is fastened to cross-bar 39. A gear-wheel 20 is fixed on the front end of shaft 19, and it meshes with pinion 21. The pinion 21 is fastened onto the lower end of a short vertical shaft which has bearings in bracket 40, and a crank-arm 22 is fastened to the upper end of the shaft of the pinion. A stiff link 23 connects the crank-arm 22 with a slide-frame 24, which is mounted in guideways 27, fastened to the bottom of the hopper. The rear end of the slide-frame is elevated somewhat, and the rear end of a cutter-blade 25 is fastened to the elevated portion of the slide-frame. The longitudinal center of the cutter-blade is in line with the vertical center of the dropper-plates, or substantially so, and its front end and one of its edges are sharpened, as indicated at 26. A slot is made in a side of the dropper-plate casing to admit the front portion of the cutter-blade, and the elevation of the blade with relation to the dropper-plates is such that it occupies a portion of the space between the two plates.

The dropper-plates are driven in the direction indicated by the arrow in Fig. 1, and the rear edges of the upper rims of the cells have raised and rounded ribs, as 37, that save the potatoes from abrasion and act to some extent as agitators to aid in settling the potatoes into the cells.

As the planter is drawn along in the act of planting the dropper-plates are rotated through sprocket-wheels 4 and 12, chain 11, shaft 13, gearing 14 and 15, and shaft 16, and the cutter-blade is given reciprocating motion toward and from the shaft 16 by means of gearing 17 and 18, shaft 19, gearing 20 and 21, crank-arm 22, and link 23. The potatoes in the lower part of the hopper settle into the cells and rest on the bottom of the hopper with their lower surfaces somewhat lower than the cutter-blade 25. The cells each approach the cutter-blade at a time when the blade is drawn away from the center of the dropper-plates as far as its motion permits, as shown in Fig. 1 and suggested in Fig. 5, and as the cell moves over the front edge of the cutter, as illustrated in Fig. 6, the cutter moves toward the center of the drop-plates in a direction substantially at right angles with the direction of motion of the cell and cuts a slice off the lower surface of the potato in the cell by a draw-cut action. The cutting operation is completed when the potato, or so much of it as is left after the cutting, is carried onto the cutter-blade and the cutter is given a retrograde motion as the cell travels across the blade that effectually disengages the cutter from all particles of potatoes which might otherwise accumulate and interfere with the perfect operation of the machine. The slices of potato that are severed by the cutter-blade are carried by the cells of the lower drop-plate into the discharge-opening of the bottom of the hopper, while the potatoes or portions thereof remaining in the cells of the upper plate ride over the cutter and settle against the bottom plate of the hopper preparatory to a repetition of the operation just described.

The cutter-blade is broad enough to cover the discharge-opening of the hopper, and its motion is so timed that when a cell is above the discharge-opening the blade extends across the opening and acts as a cut-off for the cell in the upper plate, preventing all but the slices that have been severed preparatory to planting and that are in the cell in the lower plate from passing from the hopper. The breadth of the cutter-blade is of utility in another particular beside that of forming a cut-off, as it enables contact with the potatoes to be maintained until the retrograde motion of the blade shall combine with the pushing action of the cells to easily and effectively disengage the blade from the potatoes, as hereinbefore explained. As the slices of potatoes fall from the hopper they are carried by the shank to the furrow and are then covered by the means described or by any other suitable means.

In Fig. 3 of the drawings the bottom rim of the hopper is represented as being separated from the bottom plate, a condition that does not in the preferred construction of the device actually exist. This modification is introduced in this instance in order to better show parts that would be obscured by the bottom plate of the hopper.

The advantages of the device reside largely in the superior facility with which the potatoes may be cut, the lessened liability to crush the potatoes while attempting to cut them, and the decreased tendency to clog the planting mechanism, all of which depends on the movement of the cutting-blade across the path of the cells and the sliding-cut action and scraping cleaning motion that results therefrom.

Having thus described an embodiment of my invention, I now particularly point out and distinctly claim the parts, improvements, and combinations that I desire to secure by Letters Patent, as follows:

1. In a potato-planter, a movable dropper-plate having a potato-carrying cell, and a cutter-blade movable across the path of motion of the cell.

2. In a potato-planter, a movable dropper-plate having a potato-carrying cell, and a cutter-blade movable across the path of motion of the cell simultaneous with the traverse by the cell of the path of motion of the blade.

3. In a potato-planter, a hopper having a discharge-opening, a movable dropper-plate having a cell adapted to carry potatoes to the discharge-opening of the hopper, and a cutter-blade movable over the discharge-opening and across the path of motion of the cell.

4. In a potato-planter, a hopper having a discharge-opening, a movable potato-dropper comprising two separate plates having coinciding cells, and a cutter-blade movable over the discharge-opening, between the plates of the dropper and across the path of motion of the cells.

5. In a potato-planter, the combination of a hopper having an outlet-opening in its bottom and a slot in one of its sides, a rotary dropper in the hopper comprising two separate plates having coinciding cells, and a cutter-blade extended through the slot of the hopper into the space between plates, such cutter-blade having motion over the outlet-opening and across the path of motion of the cells.

6. In a potato-planter, the combination of a hopper having a discharge-opening in its bottom, a slot in its side and guideways on its bottom, a rotary dropper, in the hopper, comprising two separate plates having coinciding cells, a slide-frame in the guideways, and a cutter-blade fastened to the slide-frame and extended through the slot into the space between the plates of the dropper.

7. In a potato-planter, the combination of a hopper having a discharge-opening in its bottom, a slot in its side and guideways on its bottom, a rotary dropper comprising two separate plates having coinciding cells, a slide-frame in the guideways, a cutter-blade fastened to the slide-frame and extended through the slot of the hopper into the space between the plates, a transverse shaft under the hopper, by which the dropper is driven, a shaft geared to the transverse shaft at one end and to a crank-arm at the other end, and a link connecting the crank-arm with the slide-frame.

8. In a potato-planter, a movable dropper-plate having a potato-carrying cell, and a cutter-blade having a complete back-and-forth motion across the path of the cell while the cell is traversing the blade.

9. In a potato-planter, a dropper-plate having cells the rear, upper edges of which are raised and rounded.

In testimony whereof I sign my name in the presence of two subscribing witnesses.

J. EDW. BERING.

Attest:
L. P. GRAHAM,
R. J. SIMPSON.